(12) United States Patent
Jitkoff et al.

(10) Patent No.: US 10,235,034 B2
(45) Date of Patent: Mar. 19, 2019

(54) HAPTIC FEEDBACK TO ABNORMAL COMPUTING EVENTS

(75) Inventors: John Nicholas Jitkoff, Palo Alto, CA (US); Kan Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 855 days.

(21) Appl. No.: 13/300,240

(22) Filed: Nov. 18, 2011

(65) Prior Publication Data

US 2012/0127071 A1 May 24, 2012

Related U.S. Application Data

(60) Provisional application No. 61/415,179, filed on Nov. 18, 2010, provisional application No. 61/458,326, filed on Nov. 18, 2010.

(51) Int. Cl.
| | |
|---|---|
| *G06F 3/0484* | (2013.01) |
| *G06F 3/0485* | (2013.01) |
| *G06F 3/048* | (2013.01) |
| *G06F 3/0481* | (2013.01) |
| *G06F 3/0488* | (2013.01) |

(52) U.S. Cl.
CPC .......... *G06F 3/04855* (2013.01); *G06F 3/048* (2013.01); *G06F 3/0481* (2013.01); *G06F 3/04883* (2013.01)

(58) Field of Classification Search
CPC ................................. G06F 3/041; G06F 3/016
USPC ........... 345/156, 168–173; 340/407.1, 407.2; 463/30
See application file for complete search history.

(56) References Cited

U.S. PATENT DOCUMENTS

| | | | |
|---|---|---|---|
| 7,205,978 B2 | 4/2007 | Poupyrev et al. | |
| 8,599,047 B2* | 12/2013 | Schlosser et al. | 341/27 |
| 2008/0055254 A1 | 3/2008 | Willey | |
| 2009/0167508 A1* | 7/2009 | Fadell | G06F 3/016 340/407.2 |
| 2009/0282331 A1* | 11/2009 | Nagasaka | 715/701 |
| 2011/0090070 A1 | 4/2011 | Modarres et al. | |
| 2011/0201387 A1* | 8/2011 | Paek | G06F 3/0237 455/566 |
| 2011/0234488 A1* | 9/2011 | Ge et al. | 345/156 |

(Continued)

FOREIGN PATENT DOCUMENTS

| | | |
|---|---|---|
| EP | 2 116 927 | 11/2009 |
| EP | 2 138 927 | 12/2009 |
| EP | 2 166 445 | 3/2010 |

OTHER PUBLICATIONS

Dunlop et al. "Tactile feedback for predictive text entry." CHI 2009-Digital Life, New World: Conference Proceedings and Extended Abstracts; The 27th Annual Chi Conference on Human Factors in Computing Systems, 2009, Boston, MA, pp. 2257-2260.

(Continued)

*Primary Examiner* — Van N Chow
(74) *Attorney, Agent, or Firm* — Fish & Richardson P.C.

(57) ABSTRACT

A computer-implemented tactile feedback method includes receiving user input on a computing device, identifying a term input by the user that does not match a term known to the device, accessing an auto-correction service in order to provide a replacement for the term, and energizing a haptic feedback device in response to identifying the term input by the user that does not match a known term.

9 Claims, 11 Drawing Sheets

(56) References Cited

U.S. PATENT DOCUMENTS

2011/0260996 A1   10/2011  Henricson
2012/0113008 A1*   5/2012  Makinen ................ G06F 3/016
                                                        345/168

OTHER PUBLICATIONS

Authorized Officer T. Pfaffelhuber. International Search Report and Written Opinion in International Application No. PCT/US2011/061518, dated Mar. 9, 2012, 14 pages.

International Preliminary Report on Patentability in International Application No. PCT/US2011/061518, dated May 30, 2013, 9 pages.

Hoffmann. "Haptic Keyboard Prototype for Data Entry." Diploma Thesis, Computer Science Department, RWTH Aachen University, submitted May 29, 2008, 129 pages.

Kaaresoja et al. "Snap-Crackle-Pop: Tactile Feedback for Mobile Touch Screens." Proc EuroHaptics International Conference, Paris, France, 2006, 2 pages.

Sparking Tech [online]. "Haptic Feedback in Touchscreen Cell Phones Getting Fancier," 2008, [retrieved on Nov. 28, 2011]. Retrieved from the Internet: <URL: http://sparkingtech.com/tech-sci-news/haptic-feedback-in-touchscreen-cell-phones-getting-fancier >. 1 page.

*Sprint User Guide—HTC EVO 4g*, "Home Screen," Sprint, 2010, p. 22.

The Economic Times [online]. "Phones with 'Feeling' May Cut Typing Errors," 2008, [retrieved on Nov. 28, 2011]. Retrieved from the Internet: <URL: http://articles.economictimes.indiatimes.com/2008-03-25/news/27732876_1_touch-screen-phones-keyboard-button>. 2 pages.

International Search Report & Written Opinion for Application No. PCT/US2011/061527, dated May 16, 2012, 16 pages.

* cited by examiner

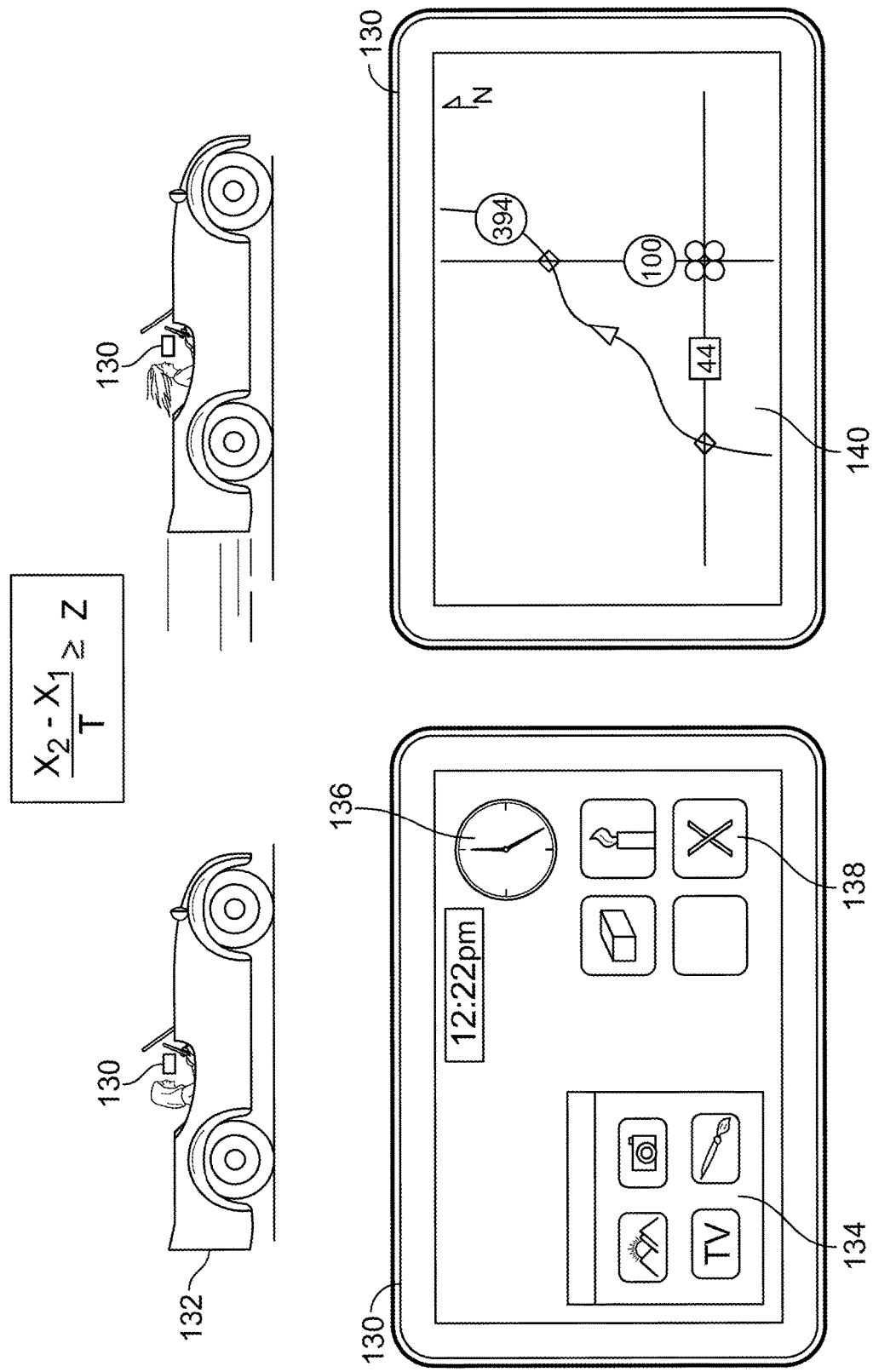

HAPTIC FEEDBACK TO ABNORMAL COMPUTING EVENTS

CROSS-REFERENCE TO RELATED APPLICATION

The present application claims priority to U.S. Provisional Application Ser. No. 61/415,179, titled "User Interaction in a Computer Operating System", filed on Nov. 18, 2010, and U.S. Provisional Application Ser. No. 61/458,326, titled "User Interaction in a Computer Operating System," filed Nov. 18, 2010 the contents of which are incorporated by reference as if set forth fully herein.

TECHNICAL FIELD

This document relates to systems and techniques for interacting with users of a computer operating system.

BACKGROUND

As computers become more present in normal daily activities, the manner in which users interact with computers becomes more important. For example, while early computers used punch cards for interaction with a limited group of users, desktop personal computers led to more prolonged interaction with more users, and to the development of graphical user interfaces. Such interfaces became part of the computer operating systems themselves, and were further extended by applications that ran on the operating systems.

Computing devices are now frequently portable and carried by a user, such as in the form of smart phones and similar devices. Because such device may be of a limited size that makes interaction via a keyboard less practical than for a desktop or laptop computer, alternative mechanisms for action may be provided, such as in the form of touch screen user interfaces that display graphical content and can also receive user inputs over that content. Other input mechanisms can also be used, such as voice input and gesture-based inputs that can be sensed by accelerometers or compasses in a mobile device.

SUMMARY

This document describes systems and techniques that may be used to interact with a user of a computing device, such as a mobile computing device (e.g., a smart phone). The various techniques described here can provide mechanisms for more intuitive user interaction with a device, including by signaling the user with the device and for responding to user inputs provided to the device. User feedback can take the form of audible signals, haptic feedback (e.g., coordinated vibrations of the device) and movement of on screen user interface elements.

For example, as discussed in particular detail below, a device may provide various levels of haptic feedback while a user is typing in order to signal the user that corrections are being made (by the device) or need to be made (by the user). For example, if a device fails to recognize a word or phrase that is typed by a user (e.g., it does not appear in a dictionary accessed by the device), the device may attempt to automatically correct the word or phrase. If the device has a high confidence in its chosen correction, it may make the correction automatically, and if it has lower confidence (below a determined confidence level), it may ask the user to make the correction such as by picking from a displayed or spoken list of candidate corrections. Because a user may be staring at his or her fingers and the keyboard while typing (particularly on a touchscreen virtual keyboard), different types of haptic feedback may be provided when the different types of corrections are identified by a device. For example, each time a device makes a correction automatically, it may vibrate very briefly, whereas if it needs a user to make a change, it can vibrate for a noticeably longer period. A user of such a device can quickly learn to ignore the short vibrations or look up quickly to confirm that the corrections associated with them were made properly. In contrast, a user may learn quickly to stop typing when there is a long vibration, since the device may have stopped accepting input until the user can select one of the corrections. Alternatively, the device could provide a long vibration at such a point and allow the user to keep typing, and could then mark all locations in the text at which there was a long vibration in a manner that the user can see where such locations occur. The user can then select each such location and select the proper answer for each location after all the typing is completed.

In yet other examples, very different types of feedback may be provided depending on whether the correction can be made automatically or requests user intervention. For example, the short vibrations discussed above may be provided for each automatic correction. In contrast, audible feedback, such as a beep may be generated if a user is asked to intervene and complete a correction (either by typing the right letters or selecting one of a plurality of candidate solutions from a list).

In certain implementations, such systems and technique may provide one or more advantages. For example, user interaction with a computing device may be improved and users may be more likely to purchase more devices and recommend them to others. Such improvement may occur because a user can correct typing problems more easily and can type more quickly if he or she has confidence that he or she can catch errors readily. Also, with greater confidence that messages will not be sent with embarrassing errors in them, a user may employ various messaging functionality on a computing device and may thus have greater satisfaction overall with the device. Also, authors of applications may benefit in being able to provide their applications using interfaces like those discussed here, and may also be able to generate new and additional kinds of applications.

In one implementation, a computer-implemented tactile feedback method is disclosed. The method comprises receiving user input on a computing device; identifying a term input by the user that does not match a term known to the device; accessing an auto-correction service in order to provide a replacement for the term; and energizing a haptic feedback device in response to identifying the term input by the user that does not match a known term. Energizing the haptic feedback device can comprise selecting from between a first mode of energizing the haptic feedback device that corresponds to identifying a replacement for the term, and a second mode of energizing the haptic feedback device that corresponds to failing to identify a replacement or the term. The method can also include replacing the term input by the user with the replacement for the term in coordination with energizing the haptic feedback device, and also receiving a user correction of the term input by the user after energizing the haptic feedback device. In addition, the method may further comprise, in coordination with energizing the haptic feedback device, displaying one or more suggested corrections on a display of the computing device, receiving a user selection of one of the suggested corrections, and replacing the term input by the user with the selected correction.

In some aspects, the method also includes generating an audible signal in coordination with energizing the haptic feedback device, and the energizing of the haptic feedback device results in the computing device vibrating for a short time period.

In another implementation, a computer-implemented user interface system in a computing device comprises a graphical user interface arranged to receive input from a user, the interface having a display to present information responsive to the input from the user; a computer processor connected to memory storing instructions to implement a text corrector to identify likely errors in information input from the user, and to suggests corrections to the information input from the user; and a haptic feedback device and controller arranged to provide a movement of the device upon an identification by the processor of a likely error in information input from the user. The haptic feedback device can be arranged to provide the movement of the device substantially in real time with information input by a user of the device, or can be arranged to be energized by selecting from between a first mode of energizing the haptic feedback device that corresponds to identifying a replacement for the term, and a second mode of energizing the haptic feedback device that corresponds to failing to identify a replacement or the term. Also, the first mode can comprise a first predetermined number of vibrations and the second mode comprises a second predetermined number of vibrations.

In some aspects, the instructions are further arranged to replace information input by the user with a corrected version of the information input by the user. Also, the interface can be programmed to, in coordination with energizing the haptic feedback device, displaying one or more suggested corrections on a display of the computing device, receiving a user selection of one of the suggested corrections, and replacing the information input by the user with the selected correction. The method may also include a speaker and audio controller arranged and programmed to generate an audible signal in coordination with energizing the haptic feedback device.

In yet another implementation, a computer-implemented user interface system in a computing device comprises a graphical user interface arranged to receive input from a user, the interface having a display to present information responsive to the input from the user; a computer processor connected to memory storing instructions to implement a text corrector to identify likely errors in information input from the user, and to suggests corrections to the information input from the user; a haptic feedback device; and means for energizing the haptic feedback device in coordination with identification of unrecognized information in the information input from the user.

One or more of these implementations can provide various advantages. For example, rather than having a computing device automatically correct or alter user input that is assumed to be erroneous without the user being made fully aware of the "correction," the haptic feedback device provides a more noticeable indication that the user has entered what the devices deems to be an unidentified term. Furthermore, implementations disclosed herein provide the benefit of having the user—and not the device—select a replacement term. As the user has been alerted of a possible error, he or she may suggest a correction and replace the unidentified term with a selected correction, rather than having a device automatically select a replacement term, which, in many cases, is not correct or intended by the user. Additionally, some implementations advantageously provide haptic feedback only when an entire term has been entered by the user, rather than constantly interrupting a user as he or she is in the middle of inputting a term. In other embodiments, haptic feedback is provided after the user has entered a complete sentence or phrase. The timing of the haptic feedback, which is less likely to interrupt, therefore, allows for greater flow and fluidity when the user is typing.

In another implementation, a computer-implemented user interface method comprises displaying content in a first window on a display of a computing device; receiving a dragging user input on an element at a periphery of the window; and in response to receiving the dragging input, generating and displaying a second window on the display of the computing device and displaying the first window simultaneously with the second window. Displaying the first and second window can comprise automatically positioning the first window adjacent to and beside the second window, and the element at the periphery of the window can comprise a scroll bar and the dragging motion comprises a motion having a component in a direction at a right angle to normal scrolling motion of the scroll bar. Also, the dragging motion can comprise a selection on the scroll bar followed by motion into a body of a document that is being displayed in the first window.

In another implementation, a computer-implemented system for interaction with a user of a computing device is disclosed, and comprises a graphical user interface having a touch screen display; a dragging input sub-system to identify the occurrence of a contact with the touch screen display and a direction of dragging after the occurrence of a contact; and a processor operably connected to tangible computer memory that stores code to identify a dragging input on a first window at a perimeter of the first window and to create a second window in response to the identified dragging input.

In yet another implementation, a computer-implemented system for interaction with a user of a computing device is disclosed that comprises a graphical user interface having a touch screen display; a dragging input sub-system to identify the occurrence of a contact with the touch screen display and a direction of dragging after the occurrence of a contact; and means for generating a second window in response to a dragging input in the first window, and from an element at a periphery of the first window.

In another implementation, a computer-implemented navigation method is disclosed that comprises tracking motion of a portable computing device; determining that a speed of the portable computing device has reached a threshold speed; and activating a mapping application in response to determining that the speed of the portable computing device has reached a threshold speed. Activating the mapping application can comprise generating a map around a current location of the mobile computing device at a zoom level that corresponds to the determined speed of the mobile computing device.

In yet another implementation, a computer-implemented system on a mobile computing device comprises a global positioning sensing unit to identify a location of the mobile computing device; a speed calculator executed by code persistently stored on tangible memory on the mobile computing device and that is operably connected to a computer processor to execute the code to identify a speed of the mobile computing device from a plurality of global positioning system readings; a speed comparator to identify when the device exceeds a predetermined speed; a mapping application stored on and operable on the computing device to show a current geographic location of the mobile computing device on a map; and a triggering module stored in the memory and executable on the processor to activate the mapping application when the speed comparator identifies when the device exceeds the predetermined speed.

In another implementations, a computer-implemented system on a mobile computing device is discloses. The system comprises the GPS unit and speed calculator described above, and the mapping application described above, along with means for activating the mapping application when a speed of the mobile computing device exceeds a predetermined speed.

In another implementation, a computer-implemented user input process for a computing device is disclosed, and comprises receiving, on a touch pad surface over a graphical display, a user input motion dragging across the touch pad surface; identifying the dragging input motion as originating off an edge of the touch pad by identifying a sensed first location for the input motion at a peripheral edge of the touch pad surface; and displaying on the graphical display a sliding graphical element that is animated to move from the edge of the display into a body of the display, over a nonmoving element on the display, in response to identifying the dragging input motion. Receiving a user input motion can comprise receiving an input motion that enters the touch pad surface from a right or left side of the touch pad surface. The method can also include computing a vector for the dragging input motion.

In other implementations, a computer-implemented user input process for a computing device is disclosed. The process comprises receiving, on a touch pad surface over a graphical display, a user input motion dragging across the touch pad surface; identifying the dragging input motion as originating off an edge of the touch pad by identifying a sensed first location for the input motion at a peripheral edge of the touch pad surface; and displaying on the graphical display a sliding graphical element that is animated to move from the edge of the display into a body of the display, over a nonmoving element on the display, in response to identifying the dragging input motion.

The details of one or more embodiments are set forth in the accompanying drawings and the description below. Other features and advantages will be apparent from the description and drawings, and from the claims.

DESCRIPTION OF DRAWINGS

FIGS. 1E and 1F show conceptually the activation of a mapping application on a mobile computing device in response to motion of the device.

Like reference symbols in the various drawings indicate like elements.

DETAILED DESCRIPTION

This document describes systems and techniques for providing interaction with a user of a computing device, such as a mobile smart phone, using, for example, elements of an operating system that runs on the device. The system and techniques may provide various output mechanisms that can be implemented visually, audibly, or via touch, and input mechanisms for controlling the device. Multiple particular example techniques are described here, and the techniques can be implemented individually or together with other aspects of an operating system.

Figure 1B:
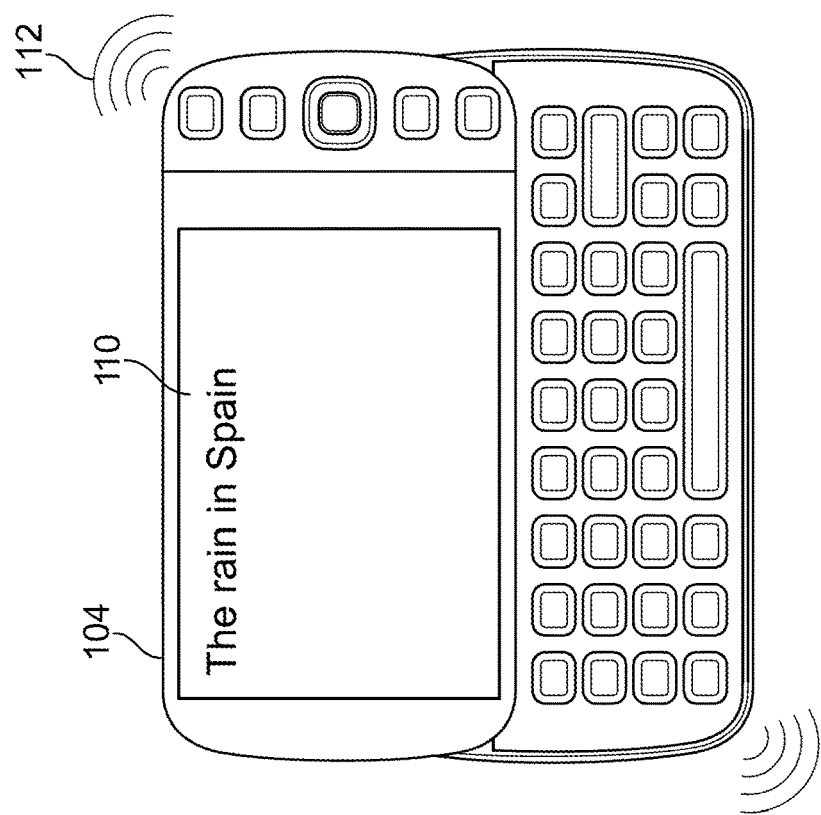
FIGS. 1A and 1B are diagrams showing haptic feedback in a mobile computing device.
Figure 1A:
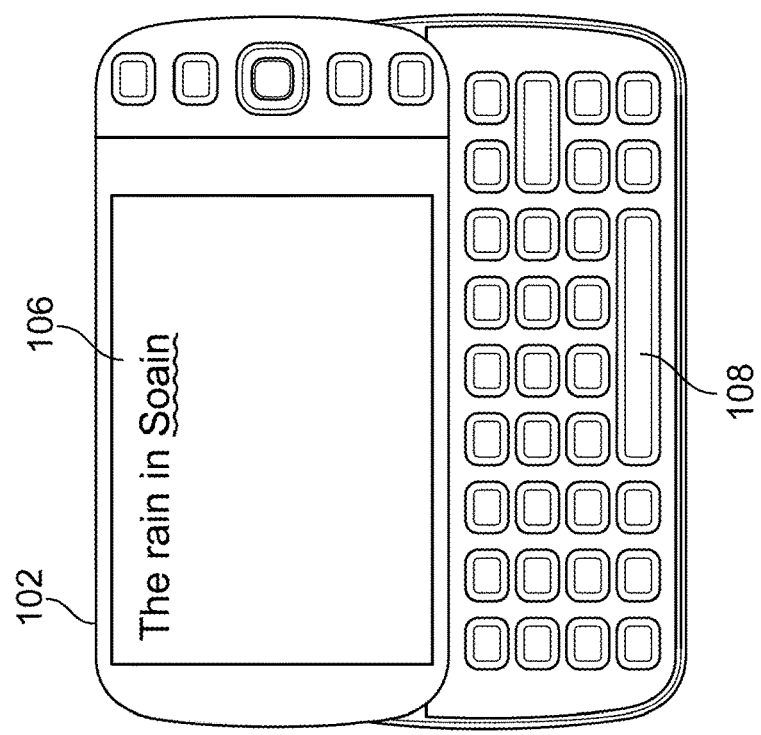

FIGS. 1A and 1B are diagrams showing haptic feedback in a mobile computing device 102. In general, the device 102 takes the form of a smart phone having a slide out keyboard 108. The device 102 also includes a graphical display on its front surface for displaying information to a user, where the display may include a touch screen input mechanism for obtaining input from a user, such as by the user touching the surface of the display with their finger or with a stylus.

In this example, the device 102 is shown in a first state, in FIG. 1A, and in a second, later state in FIG. 1B. In the first state, the device 102 is shown after the user has started typing a sentence into the device 102, such as to submit the text of the sentence as a search query, to add the text as a sentence to a word processing document or e-mail, or for other similar purposes. The phrase 106 that has been entered by the user includes a spelling error, in that the word Soain has been entered, but the user clearly intended to type the word Spain. In this example, a real-time spell checking system may determine that the word Soain does not appear in a dictionary that is stored on, or is otherwise accessible to (e.g., via a wireless network and the internet), the device 102, and may highlight the term such as by underlining it, in a manner like that performed by various spellchecking systems in existing word processor applications.

The real-time spell checking system may determine if a user-entered term is "misspelled" by comparing the term to a dictionary, a grammar/language model, and/or a user's typing history. Various other databases may be used with which to compare terms entered by the user.

The identification of a misspelled word, in addition to triggering the system to correct the spelling of the word, may also cause the device 102 to provide haptic feedback to a user. For example, depending on the action that the system takes with respect to the misspelled word, one or more distinct types of haptic feedback may be provided. As one example, the device 102 may vibrate once over a relatively short period, such as for a fraction of a second, if the device has been able to locate a spelling correction for the term, such as term 110, where the word Spain has been identified and automatically placed into the string. Alternatively, if the system is unable to identify a correction to the term 106, the device 102 may be made to vibrate two times in close succession to each other, or for one long time period.

The haptic feedback may thus trigger a user of the device to recognize that a problem has been recognized with the text that he entered so that he moves his eyes to the screen, or provides additional focus on the screen. If the user feels a single vibration, he might look up to confirm that the replacement word is correct, whereas if he feels two vibrations, he might look up and stop his typing so as to figure out if a manual correction is needed. In some embodiments, when a misspelled term is identified, only haptic feedback is provided and no corrective action is taken without user input or suggestion. For instance, the user may receive haptic feedback (e.g., in the form of one or more vibrations) and look up at his device display to see multiple replacement suggestions for an identified error. The replacement suggestions comprise a list from which the user may select the word he intended to type. That is, the device does not automatically select a replacement word—which may not be the word the user intended to type—but instead allows the user to select the correct replacement word.

In some instances, haptic feedback is provided substantially in real-time, such as right after the user has completed typing a term identified as misspelled. The device may determine that the user has completed typing a word or term when the user has entered at least one alphabetical character followed by a space or form of punctuation.

In some embodiments, haptic feedback is not provided when a misspelled word is entered until the user has finished typing a complete sentence. The device may recognize the user has finished typing a complete sentence when the user enters a form of terminal punctuation (e.g., ".", "!", or "?") followed by a space. In these embodiments, a user may appreciate that she is not being interrupted mid-thought while typing and constructing a sentence.

In addition to recognizing potential spelling errors, the device 102 may provide haptic feedback for other types of potential typographical errors or potential grammatical errors. For example, a user may accidentally be holding his finger down on a single key, thereby causing a long string of the same letter to be input. Haptic feedback may be provided to alert the unaware user of the typing.

The device 102 may provide other haptic feedback in other embodiments. For example, a small click may be provided or a low tone may be played that the user can feel in his or her hands. Also, patterns of haptic feedback other that a single vibration and a double vibration may be used. For example, the length, time-wise, of a haptic event may signal some status to the user, or the amplitude of the haptic event mat be used. As one example, a light vibration can indicate that a correction has been made and a user can probably ignore it, whereas a strong vibration can indicate that an error was identified but a correction could not be made, so that the user should pay more attention to the problem.

The haptic feedback can also be provided in response to voice input by a user. In such a situation, the system would not be looking for typing errors by the user, but instead, for situations in which the system has a low confidence that a word it has selected matches the word that the user spoke. Haptic feedback may be more helpful than audible feedback, because a user providing spoken input may not normally be looking at the screen to determine whether his or her words are being understood correctly, and audible feedback may be unnecessarily distracting to the user, as it can be hard to talk and listen at the same time. In contrast, haptic feedback would allow a user to hold his or her device, have it in a pocket or other similar location, and be notified about a problem with any speech-to-text conversion in a fairly non-invasive manner. Additionally, although haptic feedback has been described with respect to generating one or two vibrations, any number of vibrations lasting any duration may be used.

Figure 1D:
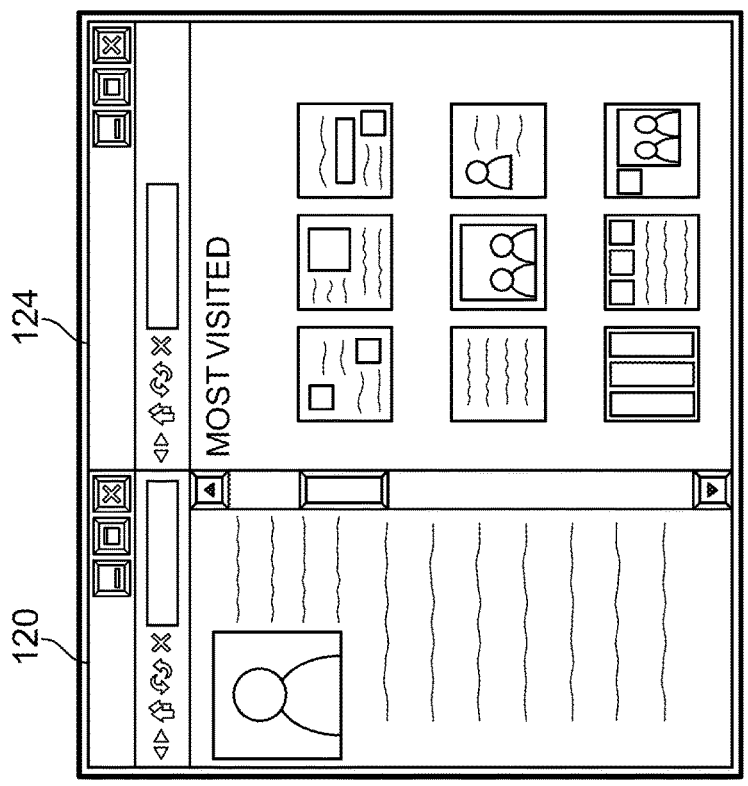
FIGS. 1C and 1D show screen shots of a technique for adding windows to a graphical user interface.
Figure 1C:
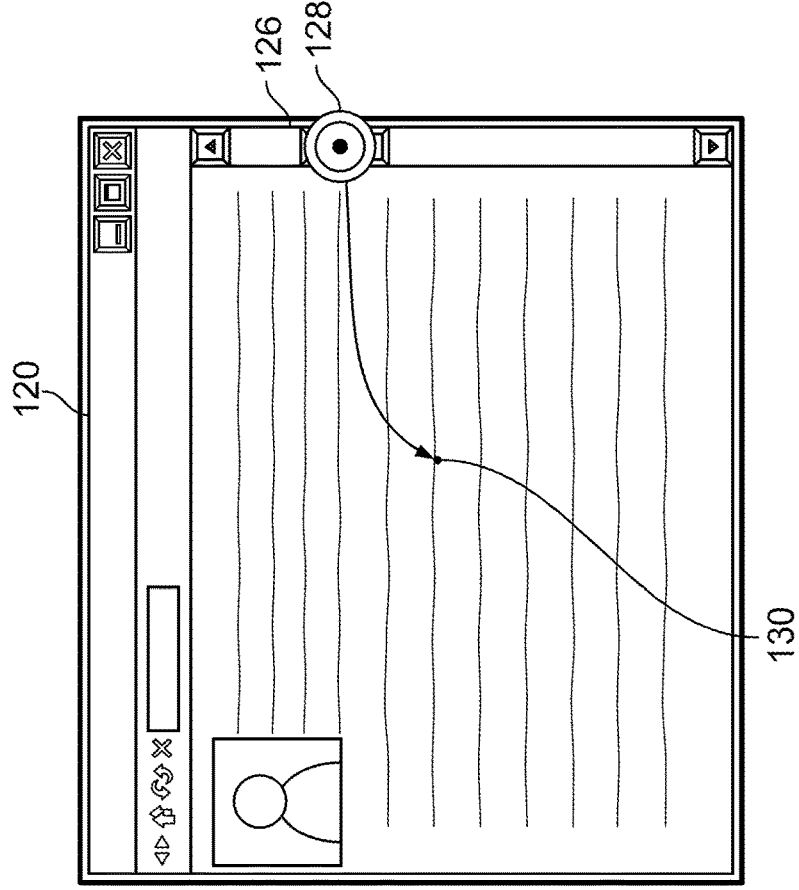

FIGS. 1C and 1D show screen shots of a technique for adding windows to a graphical user interface. The techniques discussed for these figures and other later figures are distinct from the haptic feedback techniques discussed above. However, the multiple techniques may be combined. For example, in various situations, haptic feedback of a first type may be provided when a system is uncertain of a user's intent when the user provides a command, and of a second type when the system is uncertain and the uncertainty is more concerning (e.g., because the system cannot take some defined action until the user has cleared up the uncertainty, such as by selecting a particular option from a list of potential options that have been identified by the system). In general, the technique here involves identifying a user-initiated dragging motion that starts around a periphery of a window in an operating system's graphical user interface (such as over a scroll bar), and moves into the window. Such a user motion is interpreted as an intent to add a new window, so the system creates a new window stacked to the side of the original window, which the system shrinks in size.

In FIG. 1C, a window 120 is shown with a basic web browser running in the window 120, and a web page displayed in the browser. Suppose that the user reviewing the web page is studying about a person mentioned on the web page, that the user wants to find out additional information about the person, and that the user wants to review that information in parallel with the information on the web page. One useful way to make such a review would be to provide two windows on a display in a side-by-side or similar arrangement.

A convenient mechanism by which to establish such an arrangement is shown by selection target 128, which represents the pressing by the user over a scroll bar at a right edge of the display area of the browser. An arrow in the figure from selection target 128 to drop target 130 represents a dragging motion between those two points by the user before the user lifts his or her finger (e.g., from a mouse button or a touch screen) at drop target 130. The selection target 128 can be located over a scrolling control 126 on the scroll bar or at another location on the scroll bar. The selection could also be on another peripheral element near the edge of the window 120 that is outside the display area for the browser in which web page content is displayed. Alternatively, the selection target 128 can be a location within a small distance of the periphery of the window 120, regardless of whether there is a visible element there.

FIG. 1D shows the result of the computing device's interpretation of such inputs by the user. In particular, the window 120 is shown, and a new window 124 is also shown adjacent to the original window 120. The window 120 has been contracted downward in the lateral dimension to the same extent that the user dragged in FIG. 1C, i.e., the right edge of the window 120 in FIG. 1D is approximately in line, vertically, with drop target 130. Also, a new window 124 has been instantiated automatically in response to the user input shown in FIG. 1C. The window 124 can be a standard, generic opening page for a browser, such a page that displays a search box, a page that displays thumbnails of several of the most-visited sites for the user, or other such content.

Also, the input from the user in FIG. 1C may indicate what page is to be displayed in window 124 when it is instantiated. For example, the selection target 128 may be on an element on a web page, such as a URL (where the drop target is an edge of the screen or an area outside the pane or tab that is currently the focus of the browser), and the web page for that URL may be opened in window 124.

Although the example here focuses on web browsers and web pages, the techniques may be used with other applications. For example, a user of a word processing application may make a similar dragging motion and have a new document opened in a new window or pane. The new document may be established as a subdocument, along with the original document, of a larger document that contains both subdocuments. For example, such dragging may be used to open a new chapter in a manuscript for a book, where a document for the entire book contains sub-documents for each chapter.

FIGS. 1E and 1F show conceptually the activation of a mapping application on a mobile computing device 130 in response to motion of the device 130. FIG. 1E shows the device 130 in a standing automobile 132 along with a screen shot of the device 130, while FIG. 1F shows same automobile 132 moving, along with a screen shot of the device 130, so as to highlight an example mode of operation for the device 130.

In FIG. 1E, the device 130 is mounted to the automobile 132, such as by being placed in a dock on the dash of the automobile 132. The automobile 132 is not moving, and the device 130 simply displays a desktop for an operating system on the device 130. For example, the device may display one or more icons 138 whose selection may cause various applications on the device 130 to launch, and groups 134 of icons. In addition, widgets or gadgets may be displayed on the desktop, such as a clock 136 or other such program. Thus, the display on device 130 is provided in a familiar manner.

In FIG. 1F the driver of the automobile 132 has started moving, and a GPS module in the device 130 may, as a result, compute a speed for the device 130, and in turn, for the automobile 132. Such a determination may be made according to an equation like that shown between the stationary and moving representations of the automobile 132, by determining a distance between two points over a time period, and dividing by the time period in order to obtain a rate of travel.

The device 130 in this example with a program that compares that computed speed to a predetermined speed, and when the predetermined speed is met or exceeded, the device 130 changes its display from the desktop display to a navigational display 140 in the form of a map that show the position of the device 130 and automobile 132 on the map. In this manner, the device can change modes automatically based on an inference that the moving user will want to have information about their up-to-date location.

Although the display 140 here is shown as providing only a navigational display, other information could be maintained on the display. For example, a strip along the periphery of the display may be reserved for displaying incoming messages (e.g., caller ID information for incoming telephone calls, subjects lines from incoming emails, and the like) and the user may select an area on a message alert to have more information about the corresponding message displayed over the navigational display, or may have it replace the navigational display. Also, when a particular event occurs, such as an incoming telephone call, the navigational display may be pushed to the side in a split screen, or may be removed entirely, while the user takes the call.

The type of navigational display shown to a user may also depend on the speed detected by the device 130. For example, at low speeds, the device 130 may infer that the user is walking or riding a bike, and may show a map with detail that is appropriate to such activity, such as local stores, bus stops, and ATMs. At higher speeds, the display may instead show information relevant to the driver of an automobile, such as filling stations, driving directions, and current traffic information. Certain information may be shown in both modes, such as the locations of coffee shops.

The zoom level of the navigational display may also change automatically in response to changes in speed of the device 130. For example, if the speed is under ten miles per hour so as to indicate that the user is on foot, the zoom level may be set so that the device 130 shows one or two blocks. If the speed is around sixty miles per hour, the zoom level may be reset automatically so that the device 130 shows several miles of range.

In the manners shown here, then, a navigational display may be made the focus of a device in response to sensed motion of the device, so that a user need not explicitly request such a display. Also, the particular mode of the navigational display may change, depending on the speed that the device is moving.

Figure 1H:
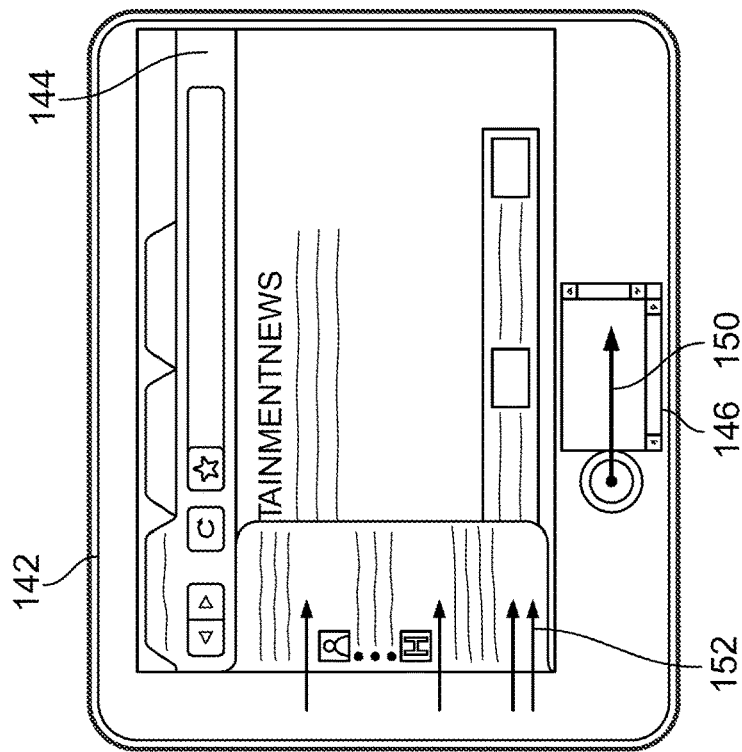
FIGS. 1G and 1H show screen shots of a computing device having a touch pad input mechanism and on-screen elements responsive to particular gestures on the touch pad input mechanism.
Figure 1G:
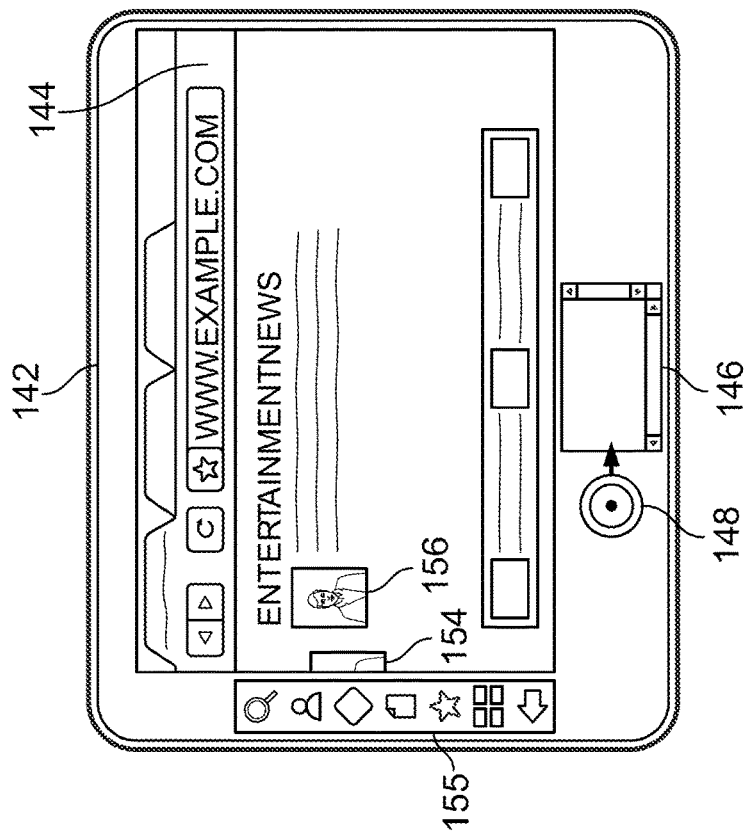

FIGS. 1G and 1H show screen shots of a computing device 142 having a touch pad input mechanism and on-screen elements responsive to particular gestures on the touch pad input mechanism. In this example, the device 142 is in the form of a notepad having a touch pad adjacent the touch screen, but would normally be in the form of a netbook or laptop that has two elements connected by a hinge, with a graphical display in one of the elements, and a keyboard with touch pad (and corresponding selection buttons) on the other element.

In FIG. 1G, the device 142 is shown displaying a web page 156 on a graphical display 144. A selectable tab 154 is shown at the left edge of the display 144. The arrow on the tab 154 indicates to a user of the de vice 142 that they can select the tab 154, such as with a pointer operating by the touch pad or a mouse, and may drag it to the right so as to drag onto the screen one or more objects that are currently (though merely by inference) located off the left side of the display 144.

Alternatively, and as shown by contact point 148, a user may indicate an intent to pull an object onto the display 144 from an area to the left of the display by contacting the device 142 to the left of touch pad 146 and then dragging their finger onto the surface of the touch pad 146 and a sufficient distance into the surface to register such an intent. Although the user's finger will not be sensed off the edge of the touchpad, its first presence right at the edge of touchpad 146 can be sense, along with its vectoring at a right angle to the left edge, in a direction onto the touchpad surface. As shown in FIG. 1H, the input form the user to point 150 on the touchpad 146 causes an information panel 152 to be animated so as to slide across the display 144 in coordination with movement of the user's finger on the touchpad. A corresponding swipe, either from off the right edge of the touchpad 146 and onto its surface, or from an area on the touchpad 146 and off the left edge of the touchpad generally in a horizontal and straight swipe, may indicate an intent to remove the information panel 152 from the display 144 so that the device 142 returns to the look of FIG. 1G.

In this implementation of user inputs, it does not matter whether, when the user swipes their finger on the touchpad 146, the corresponding point on the display 144 would be over the tab (in this situation, at the center of the display 144). Instead, the instance of the motion starting off the touchpad 146 is taken by the device as indicating that the tab 154 be grabbed by the motion, regardless of the vertical location of the finger vis-à-vis the touchpad 146.

The particular location of the point 150 may or may not affect the reaction of the device 142 to the user input. For example, the point 150 may be required to extend far enough into the touchpad 146 to at least indicate that the user is providing a horizontal input across the touchpad 146. The ultimate location of point 150 may also control how far panel 152 slides onto the display 144. For example, the panel 152 may have two vertical columns of information, and one vertical column may be displayed if the user drags less than halfway across the touchpad 146 (or some other distance), while both columns may be displayed if the user drags farther.

A touch bar 155 is also shown along a left edge of the display 144. The touch bar may be off of the graphical display portion of the device 142, on a bezel of the device 142, and may be a touch sensitive device having a relatively low resolution. As shown, in an appropriate circumstance, the touch bar 155 may have a plurality of zones that are each directed to a web browsing operation, such as showing bookmarks, going to a home page, and moving forward or backward. The areas may each be sized so that a user can easily press their thumb against the relevant selection while pinching their forefinger behind the bezel. The area of the touchbar 155 may also include functionality to identify limited motion by a user, such as a motion dragging their thumb from on top of an icon on the touch bar 155, off the edge of the touch bar 155. Such motions may be assigned to particular functions, and may also or alternatively be programmable by applications running on the device 142.

Thus, using the touch bar 155 in a bezel of the device 142, a user may be provided with additional quick-input mechanisms, but without having to add keys to a keyboard. Also, various other techniques for receiving and interpreting bezel inputs may be used. For example, the bezel selections may include icons for controlling a music player, and the touch bar 155 may wrap around the device 142, so that some of its buttons (e.g., for web browsing or something else that would occur with a laptop top open) are visible form the inside of a device 142, and its other buttons are visible form outside the device when it is closed (e.g., music player controls that may be accessed without fully powering up the device 142).

Figure 2:
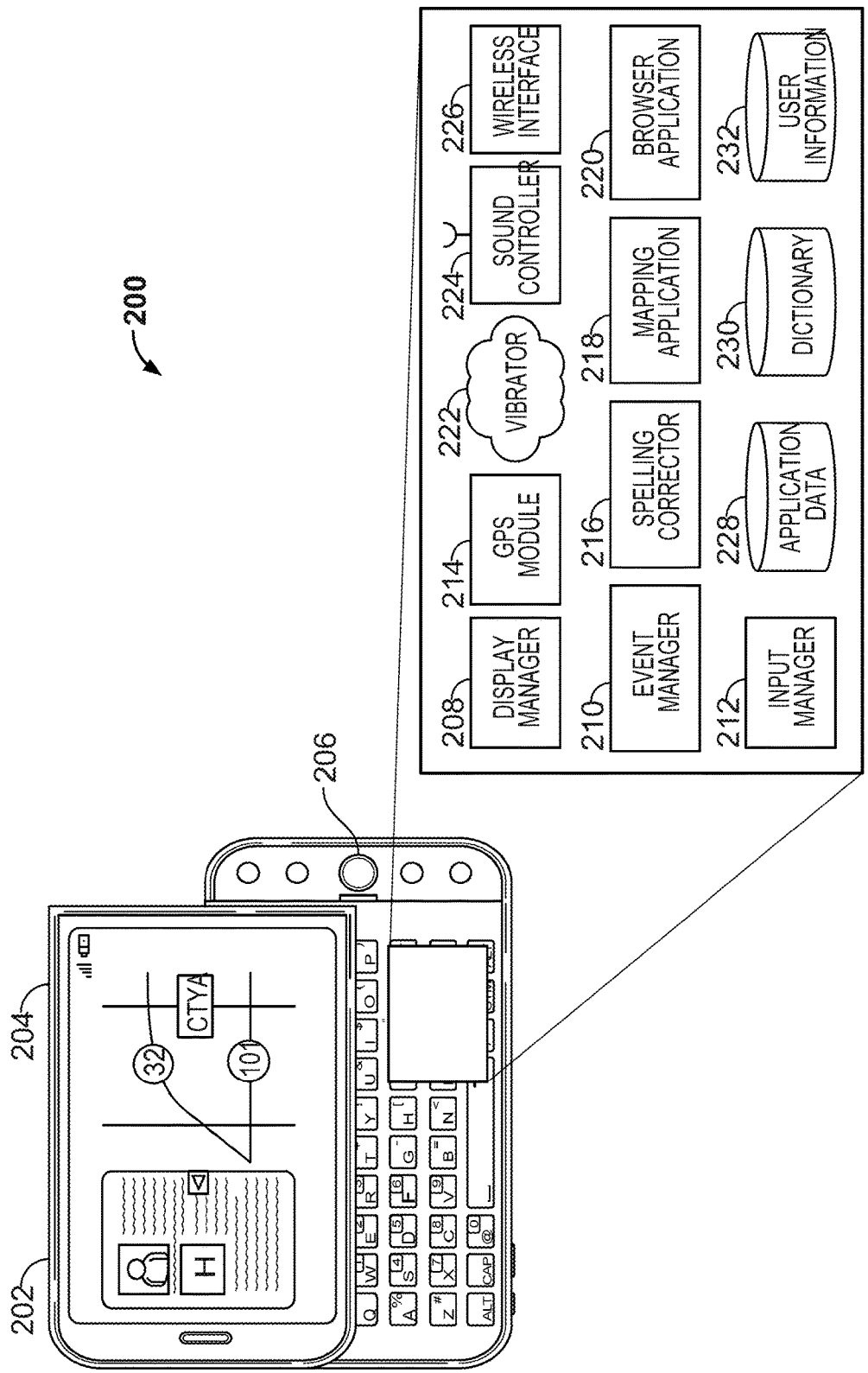
FIG. 2 is a schematic diagram of a mobile computing device.

FIG. 2 is a schematic diagram of a mobile computing device, for performing the techniques described above and below. The device is shown here in the form of a smart phone, but may take various other forms, such as a desktop personal computer, a netbook, or a laptop computer. In this example, the mobile device 202 is a slider-based smart phone having a touch screen display 204 for input and output and a trackball 206 as an alternative input mechanism.

The display 204 shows an example of a mapping application being displayed in a chrome-free browser in a manner like the pages above, and also an information panel to the left of the display 204 and extending inward form the left edge of the display, like that discussed above.

A number of components are shown schematically inside the device 202 to indicate components in the device that are associated with the features, and used to implement the techniques, discussed in more detail above and below. One or more of the components may be implemented as being stored in memory on the device and operated on a programmable microprocessor on the device 202, though the particular components are shown separately in this example for clarity of explanation. Other components and arrangements of components are also contemplated.

The device 202 includes a display manager 208 to control various elements to be shown to a user on the touch-screen display 204, while an input manager 212 manages inputs received from the touch-screen on the display 204 or other mechanisms such as trackball 206. The display manager 208 may receive information from various applications and from other components of the operating system, and may determine what elements to display in relation to other elements on the display 204, which elements to hide, and how to show visible elements in relation to each other.

The input manager 212 may coordinate with the display manager 208 so as interpret actions that a user takes with the device. For example, a user may place their finger on the touch screen display 204 or may move a pointer on the touch screen display 204 and then make a selection. The input manager 212 may refer to the display manager 208 to determine what item the user selected by such an action, and may generate an event that may be reported to various other components that may be subscribing to such an event, such as by using event manager 210.

The device 202 may also be provided with various services that may be made available to applications running on the device and/or to the operating system of the device. For example, a GPS module 214, which may be a common commercially-obtained module, may make determinations about a location of the device 204 and may provide such information to various applications, such as applications that provide driving directions, that provide the user's location for reference by friends of the user through a social network, and the like. Such a service may be referenced in relation to techniques like those discussed with respect to FIGS. 1E and 1F above, and FIG. 3C below. In a similar manner, a spelling corrector 216 may provide a service that is generally available to various applications running on the device, so that those applications can correct data that the user has input or otherwise notify the user about problems with the input. Such notification may be via haptic feedback, like that discussed with respect to FIGS. 1A and 1B above, and FIG. 3A below.

Various physical output mechanisms may also be provided in the device 202. For example, a vibrator 222 may be provided to give haptic feedback to a user. The vibrator 222 may have an associated controller (not shown) that can be called by various applications or services on the device. For example, the spelling corrector 216 may cause the device 204 to vibrate whenever a spelling error is identified by the spelling corrector 216. Also, a sound controller 224 and related audio speaker may be provided to give a user additional feedback, such as in the form of tones or synthesized speech.

Various applications such as applications 218, 220 may run on the device and may provide data for graphics to be displayed through the display manager 212. The applications may be part of an operating system on the device 202, or may be added by a user of the device 202, such as from an on-line marketplace. In this example, a first application is a mapping application 218 and may run as a standalone application or an application or plug-in that runs in browser application 220. The browser application 220 may be a standalone application or a component that is built into an operating system that runs on the device 202, and may generate displays like those described in detail elsewhere in this document. Other applications may also be provided or installed on the device 202, including by a user of the device 202.

Various messages for the operating system and the applications 218, 220, may be received over a network such as a wireless communications network connected to the internet, via a wireless interface 226. Information received from the network, such as from one or more remote servers, may be provided to the applications 218, 220, and information may be passed from the applications 218, 220 back to the network.

In addition, various forms of storage, including volatile storage and persistent storage, may be provided on the device 202. The persistent storage may include various data stores, such as application data 228, dictionary data 230, and user information 232. The dictionary data 230, as described above, coordinates with and is used by the spelling corrector 216, to provide information that permits the spelling corrector 216 to determine whether terms entered by a user are properly spelled. The application data 228 may include whatever data the various applications 218, 220, require in order to perform their functions. Depending on the application, more or less data may be stored locally on the device 202 as opposed to being stored on a remote server system. For example, certain devices may store data for a mapping application locally, whereas others may obtain mapping data (e.g., map tiles that show images of a portion of a geographic area) from a remote server as a user navigates on a map, and may dump the data soon after.

The user information 232 may include specific information about one or more users of the computing device 202. For example, the user information may include profile information for the user, as well as settings information that controls the interaction of the device 202 with the user, and that can also control the manner in which various applications operate on the device 202. Although three various data stores are shown here for clarity, much other information would be and can be stored on device 202, and need not be arranged as shown here.

Figure 3A:
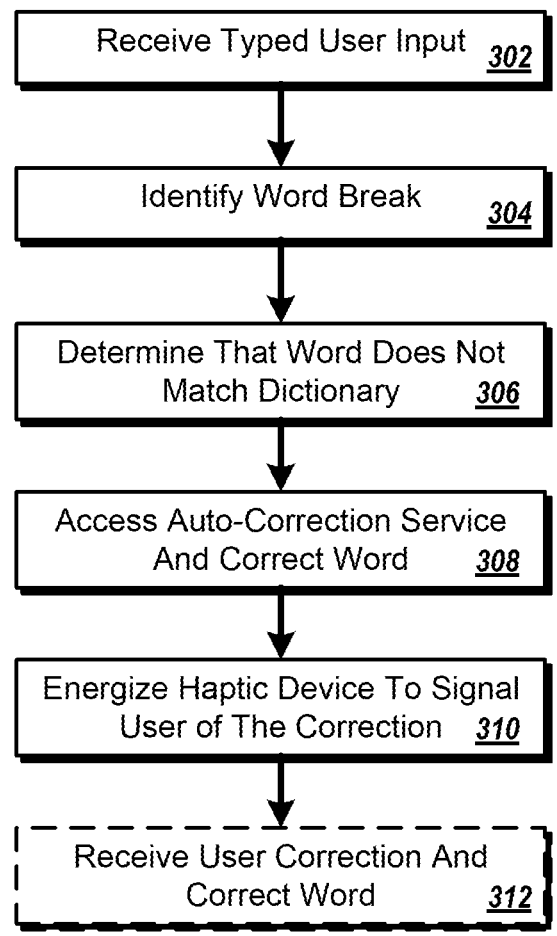
FIG. 3A is a flow chart of a process for providing haptic feedback in coordination with correcting user entry of data on a computing device.

FIG. 3A is a flow chart of a process for providing haptic feedback in coordination with correcting user data entry on a computing device. In general, the process involves automatically shaking or vibrating a mobile device in order to indicate to a user that a successful or an unsuccessful change (on non-change) has been made to information being input by the user.

The process begins at box 302, where a computing device receives a typed user input. Such an input may occur through one or more applications running on the device, such a word processing application, e-mail application, web browser applications, and other similar applications. The input may also be spoken input that is converted to text for the application, such as by a speech-to-text convertor. At box 304, the process identifies a word break in the input text, such as a space or punctuation mark entered by a user, or the end of a word as determined by the speech-to-text converter. At box 306, a spelling correction application analyzes the entered word, or a phrase made up of multiple words, and determines that the word does not match any word in a dictionary that is stored on the device, or made accessible by the device. Such a determination may be made simply by comparing a word to a list of words in a dictionary or by comparing word in context to better determine the proper spelling of the word. The word may also be compared to other databases, such as a grammar/language model, the user's typing history, or a history of words that have been received by the device.

At box 308, the process accesses an auto-correction service to correct the word. Such a service may be implemented in a variety of familiar forms, so as to use dictionary data to determine a proper word spelling, or to determine what word a speaking user spoke.

At box 310, the process energizes a haptic device to signal to a user correction of the word. Such signaling may involve energizing the haptic device so that the user lightly feels vibration. After using the device for awhile, the user will inherently understand that the vibration indicates a correction to data being entered on the device. A stronger vibration, or two instances of vibration in close succession, may be used to indicate that the device could not correct the spelling of the term, or could not recognize the term spoken to the device. Other similar haptic feedback mechanisms may also be provided in response to identifying errors in user input, either when the errors in the text correct automatically or when they correct automatically, with a less intrusive signal when corrections can be made automatically, and a more serious signal when they cannot be corrected properly or a word cannot be determined. In the latter case, the more serious signal may cause the user to stop what they are doing and pay more attention to the device to make a manual correction of their input.

Box 312 shows such a user's manual correction of a word. The box is shown in dashed format because a user need not make such a correction, and can ignore their device, even when the haptic feedback indicating device could not make the correction automatically, such as when the user does not want to stop their input at the current time, and intends to make corrections after they finish entering data.

In this manner, a computing device may conveniently provide input back to a user who is entering data to the device. The alerting mechanism may be low key, in that it may be provided so as not to interrupt the user is entering the information, and the user need not stop the entry of information to be so notified. The user may thus continuing entering information if they choose, or to address a problem in their entry of information if they choose.

Figure 3B:
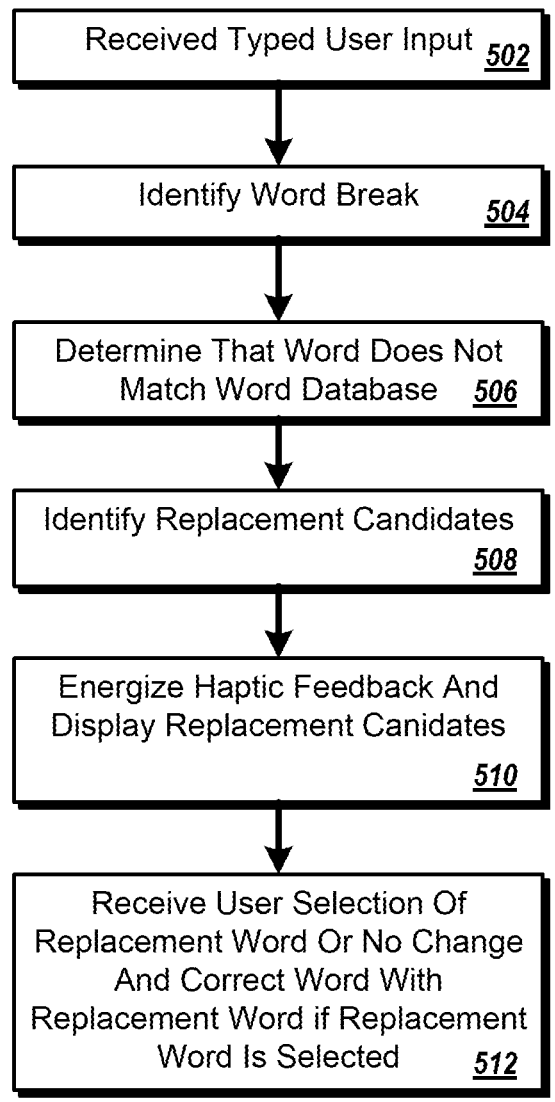
FIG. 3B is a flow chart of an alternative embodiment of a process for proving haptic feedback in coordination with correcting user entry of data on a computing device.

FIG. 3B is a flow chart of an alternative implementation of a process for providing haptic feedback in coordination with correcting user data entry on a computing device. In general, the process involves automatically shaking or vibrating a mobile device in order to indicate to a user that an entered term is potentially misspelled or entered erroneously.

The process begins at box 502, where a computing device receives a typed user input. Such an input may occur through one or more applications running on the device, such a word processing application, e-mail application, web browser applications, and other similar applications. The input may also be spoken input that is converted to text for the application, such as by a speech-to-text convertor. At box 504, the process identifies a word break in the input text, such as a space or punctuation mark entered by a user, or the end of a word as determined by the speech-to-text converter. At box 305, a spelling correction application analyzes the entered word, or a phrase made up of multiple words, and determines that the word does not match any word in a dictionary that is stored on the device, or made accessible by the device. Such a determination may be made simply by comparing a word to a list of words in a dictionary or by comparing word in context to better determine the proper spelling of the word. The word may also be compared to other databases, such as a grammar/language model, the user's typing history, or a history of words that have been received by the device.

At box 508, the process identifies possible candidates to replace or correct the potentially misspelled or mis-typed term. Possible replacement candidates may be gathered using the spelling correction application using a stored dictionary. The dictionary may be supplemented with other databases, as described above. Possible replacement candidates may be chosen based on the context in which potentially misspelled or mis-typed term is presented or based on the characters and character placement of the potentially misspelled or mis-typed term.

At box 510, the process energizes a haptic device to signal to a user that the word or term is potentially misspelled or mistyped. Such signaling may involve energizing the haptic device so that the user lightly feels vibration. In some instances, other methods of alerting the user may be used in conjunction with the haptic feedback. For example, an audible signal may be generated in coordination with energizing the haptic feedback.

Box 512 shows receiving a user's selection of a replacement word from the list of replacement candidates. In some instances, the user has the option to enter a replacement word that is not displayed as one of the replacement candidates. If the user chooses a replacement candidate or submits his or her own replacement candidate, the originally-entered word may be automatically replaced with the corrected term. The user may also have the option to leave the originally-entered word if it was his or her intent to type that term.

Figure 3C:
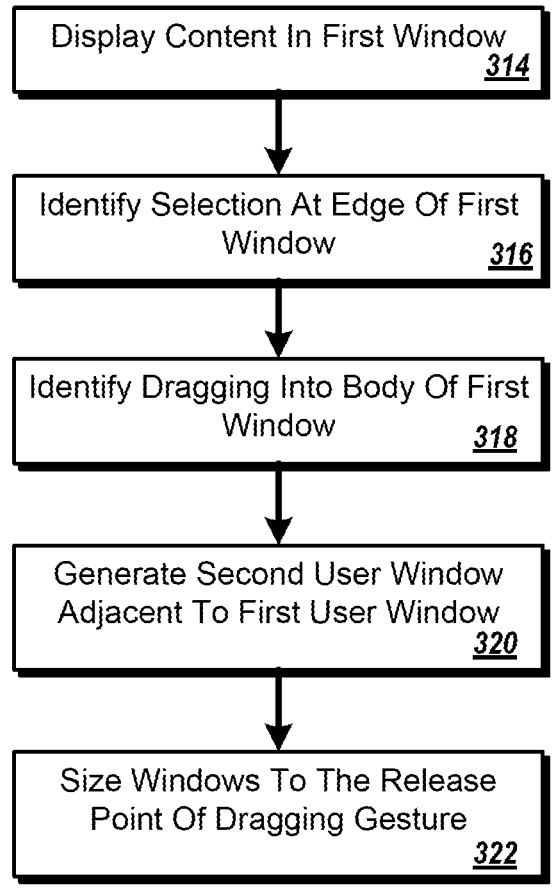
FIG. 3C is a flow chart of a process for generating display elements in response to user inputs on a window periphery.

FIG. 3C is a flow chart of a process for generating display elements in response to user inputs on a window periphery. In general, the process involves opening a new window or similar on-screen elements on a graphical user interface in response to a user selection near a periphery of the window that is already displayed on the interface. A user selection may begin at a periphery of a window and slide the interior portion of window, essentially indicating a user intent to slide one side of the window to the side, and also to provide a new window in the area vacated by the first open window. In this document, the term window is used to identify a graphical on-screen element that is set off from elements around it by a border and where selections inside the border represent user actions with respect to a particular application.

The process begins at box 314, where content is displayed in a first window in a graphical user interface. The content may be a web page in a web browser, a document in a word processing application, or of another similar form. In certain instances, a scroll bar may be displayed in a familiar manner along one side of the content, or along the top or bottom of the content, to permit accelerated movement through the content. At box 316, the process identifies a selection at an edge of the first window, such as in an area where a scroll bar is displayed. The selection may occur in a particular area of the scroll bar, such as where a scroll button is displayed in the scroll bar. At box 318, process identifies a dragging into a body of the first window. In particular, the process may determine that a user has first selected along a periphery of the window, such as along a periphery of the graphical display itself, and has dragged inward into a body of a document, such as by a horizontal dragging from left to right or right to left.

In response to identification of such dragging, the process at box 320 may generate a second user window adjacent to the first user window. Such generation of a second window may occur after the process has contracted the first window to make room on the display or the second window. Such generation of a second window may also await a user release of a pointer button, so that the user can initially slide inward and see outlined images of the windows displayed while they move so that they can see the future size of the two windows as they move.

A contraction of the first window, and the positioning of the second window, may be placed in a variety of locations, and one such location may be at a point at which the user releases their selection button after starting their dragging motion at a periphery of the window. For example, if a first window fills the entire display, and a user drags from a right hand scroll bar of the window halfway across the display to the left, the first window may fill the left half of the display after such an operation, and the new window may fill a right half of the display, as shown at box 322.

The information shown in the new window may take a variety of forms. For example, a blank document may be initially displayed in the second window, such as a blank word processing document or a generic first screen for a web browser, which shows a number of prior websites the user has visited or a search box in which the user may enter one or more search query. The new window may alternatively display information related to what is being displayed in the first window, such as a target of a web page link. In such a manner, a user may click on a link on a first page and drag to the periphery of the page or into an area out of the window, and order to open a new window that automatically displays the target of the link. Alternatively, the user motion may start at a periphery of the window and drag to a link on a page in order to open the target of the link in a new window (which may be a tab in a tabbed browser).

Figure 3D:
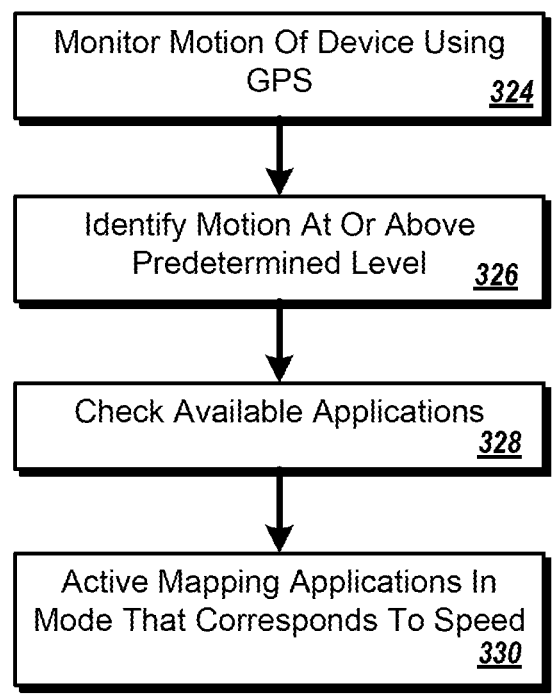
FIG. 3D is a flow chart of a process for activating a navigational application automatically in response to motion of a computing device.

FIG. 3D is a flow chart of a process for activating a navigational application automatically in response to motion of a computing device. In general, the process involves changing a display on a computing device, and generally a mobile computing device, automatically in response to changes in speed of the device.

The process begins at box 324, where a process monitors motion of a device that uses GPS functionality or other functionality such as by triangulation among cellphone towers or WiFi hot spots, among other techniques. The monitoring may occur in an event handler on the device as part of the device operating system, where various applications or other processes may register an intent to be notified when information is generated by the GPS module of the device.

At box 326, the process identifies motion at or above a predetermined level. Such a determination may be made by an event handler itself, so that a notification is provided to an application only when the speed is above a certain level. Alternatively, an application in accordance with the process described here may receive any GPS data being generated by device, and may make its own determination that a speed of the device has exceeded a predetermined level.

At box 328, the process checks available applications, which may be applications that expressed an intent to be notified when the speed of the device exceeds a certain speed. One such application may include a mapping application that may be programmed to automatically instantiate itself and become the focus of the device when the speed of the device exceeds a certain predetermined level, such as a level to indicate that a user is walking, biking, or driving from one place to another. At box 330, the process activates the mapping application, or another application, in a mode that corresponds to the speed determined by the GPS unit. For example, a first mode may relate to a low-speed motion, such as walking by a user, so that the mode displays information that is relevant to a walking user. A second mode may be triggered in response to speeds that indicate driving by the user, and may display information with a mapping application that is relevant to a driver, such as the location of filling stations and fast food restaurants near a road on which the device is moving.

In this manner, the techniques shown here may be used to automatically change a focus of a mobile device to applications that are relevant to a user who is moving with their mobile device. As a result, the user may receive information without having to expressly ask for the information, and potentially without having to remove the user's attention from walking or driving, as the case may be.

Figure 3E:
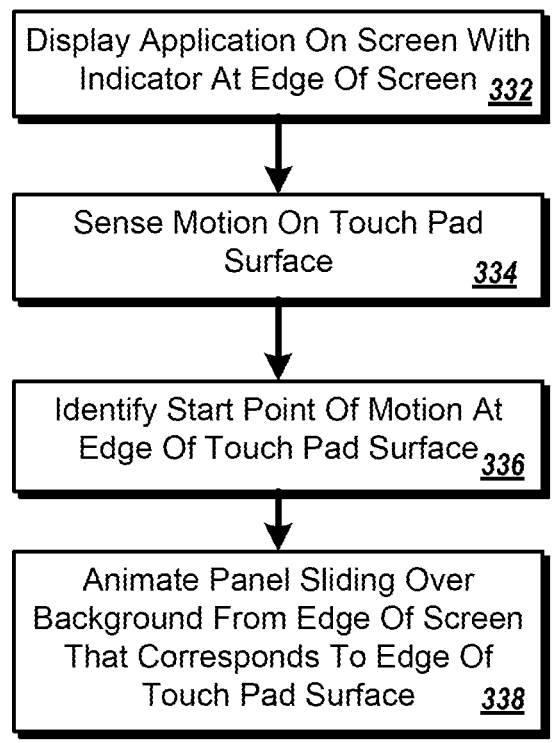
FIG. 3E is a flow chart of a process for introducing elements to a graphical display in response to user manipulation of a touch pad.

FIG. 3E is a flow chart of a process for introducing elements to a graphical display in response to user manipulation of a touch pad. In general, the process involves identifying a user motion from off the surface of a touch input mechanism and into an area on the touch input mechanism, where the start of motion is inferred as being off the mechanism by the fact that the mechanism first senses contact or motion at its very edge.

The process begins at box 332, where the device displays an application on a screen and an indicator at the edge of the screen. In this example, the indicator at the edge of the screen visually identifies to the user of the device that a normally visible element is being docked off the edge of the display of a graphical user interface. The element in this example is shown with an arrow on it so as to naturally indicate to a user that selection of the element will create some sort of motion in the direction of the arrow. Other mechanisms may also be used to indicate to a user of a graphical element is, in a sense, currently located off an edge of the graphical display.

At box 334, the process receives motion on a touch pad surface of the device, and at box 336, the device identifies a start point of the motion at an edge of the touch pad surface. The device may also identify that the motion had a velocity at the edge of the touchpad, and thus must have started off the edge of the touchpad. A device may use such determinations to identify that the motion started off the touch pad on the edge where contact is first identified as occurring, and that the input moved onto the touch pad from where it started. The device may then interpret such a motion as involving a user intent to slide an item from off a graphical user display and onto the display, from a side of the display that corresponds to the side of the touchpad from which the user slid his or her finger onto the touch pad. Such a determination may be made even if the point of contact on the touchpad would not correspond to the position on the display of the tab or other element that indicates to a user that there is an off-screen element to be brought onto the display.

At box 338, the process animates a panel sliding over the background and/or over other displayed applications on the display, from the edge of the screen that corresponds to the edge of the touchpad on which the user's input entered the touchpad. The animation may be a simple sliding into view of the element, or a more complex motion. Also, the visual element that is animated into view may take a variety of forms, such as a ribbon, panel, or toolbar. The user may hide the element again by swiping from a location on the touchpad off the edge of the touchpad.

By this process, then, a device may provide a convenient mechanism by which to extend a display, so that certain elements may be moved easily off the actual display and then moved back onto it. A user may quickly retrieve additional content without having to carefully position a pointer or other item, but may instead quickly swipe in a general area around a touch pad or similar input mechanism.

Figure 4:
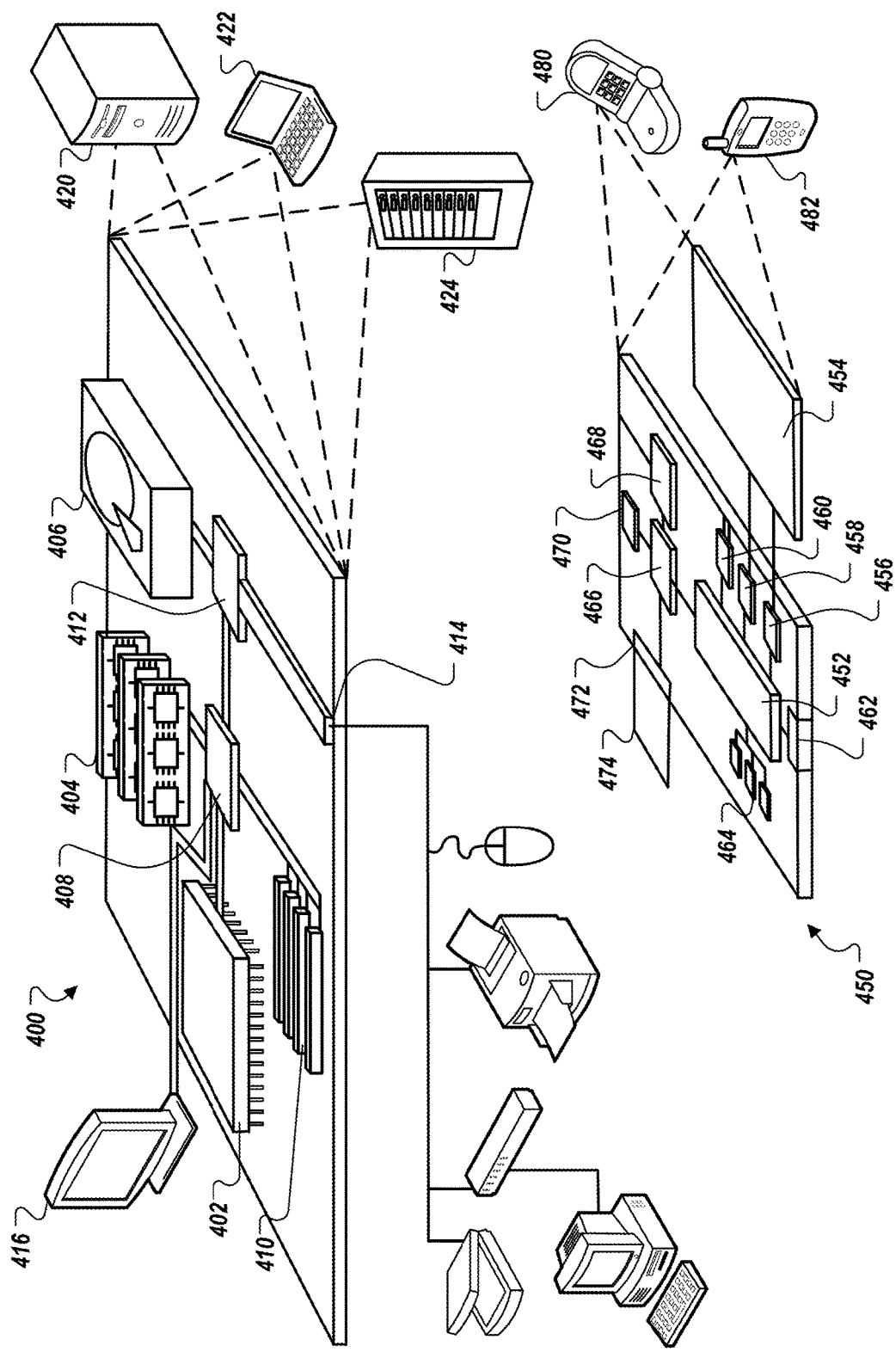
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user interface system in a computing device, the system comprising:
   a graphical user interface arranged to receive input that includes a term from a user, the interface having a display to present information responsive to the input from the user;
   a computer processor connected to non-transitory memory storing instructions to implement a text corrector to identify likely errors in the term input from the user, and to suggest corrections to the term input from the user; and
   a haptic feedback device and controller arranged to provide a movement of the device upon an identification by the processor of a likely error in the term input from the user,
   wherein the haptic feedback device is arranged to be energized by selecting from between a first mode of energizing the haptic feedback device when a replacement for the term is identified, and a second mode of energizing the haptic feedback device that provides different haptic feedback than does the first mode when a replacement for the term is not identified.

2. The system of claim 1, wherein the haptic feedback device is arranged to provide the movement of the device substantially in real time with input by a user of the device.

3. The system of claim 1, wherein the first mode comprises a first predetermined number of vibrations and the second mode comprises a second predetermined number of vibrations.

4. The system of claim 1, wherein the instructions are further arranged to replace the term input by the user with a corrected version of the term input by the user.

5. The system of claim 1, wherein the interface is programmed to, in coordination with energizing the haptic feedback device:
   (i) display one or more suggested corrections on a display of the computing device,
   (ii) receive a user selection of one of the suggested corrections, and
   (iii) replace the term input by the user with the selected correction.

6. The system of claim 1, further comprising a speaker and audio controller arranged and programmed to generate an audible signal in coordination with energizing the haptic feedback device.

7. A computer-implemented user interface system in a computing device, the system comprising:
   a graphical user interface arranged to receive input that includes a term from a user, the interface having a display to present information responsive to the input from the user;
   a computer processor connected to non-transitory memory storing instructions to implement a text corrector to identify likely errors in the term input from the user, and to suggest corrections to the term input from the user;
   a haptic feedback device; and
   means for energizing the haptic feedback device in coordination with identification of unrecognized information in the term input from the user,
   wherein the haptic feedback device is arranged to be energized by selecting from between a first mode of energizing the haptic feedback device when a replacement for the term is identified, and a second mode of energizing the haptic feedback device that provides different haptic feedback than does the first mode when a replacement for the term is not identified.

8. A computer-implemented method comprising:
   receiving, by a computing device, first user input that specifies a first term;
   presenting, by the computing device with a graphical user interface, the first term responsive to the first user input;
   identifying, by the computing device, likely error in the first term specified by the first user input;
   determining, by the computing device, that a replacement term is identified for the first term;
   energizing, by the computing device, a haptic feedback device with a first mode of energizing the haptic feedback device responsive to having determined that a replacement term is identified for the first term;
   receiving, by the computing device, second user input that specifies a second term;

presenting, by the computing device with the graphical user interface, the second term responsive to the second user input;
identifying, by the computing device, likely error in the second term specified by the second user input;
determining, by the computing device, that a replacement term is not identified for the second term; and
energizing, by the computing device, the haptic feedback device with a second mode of energizing the haptic feedback device responsive to having determined that a replacement term is not identified for the second term.

9. The computer-implemented method of claim 8, wherein the first mode comprises a first predetermined number of vibrations and the second mode comprises a second predetermined number of vibrations.

* * * * *